Aug. 5, 1952     F. H. STARK     2,606,122
ACCELERATED AGING OF CHEESE
Filed June 9, 1947
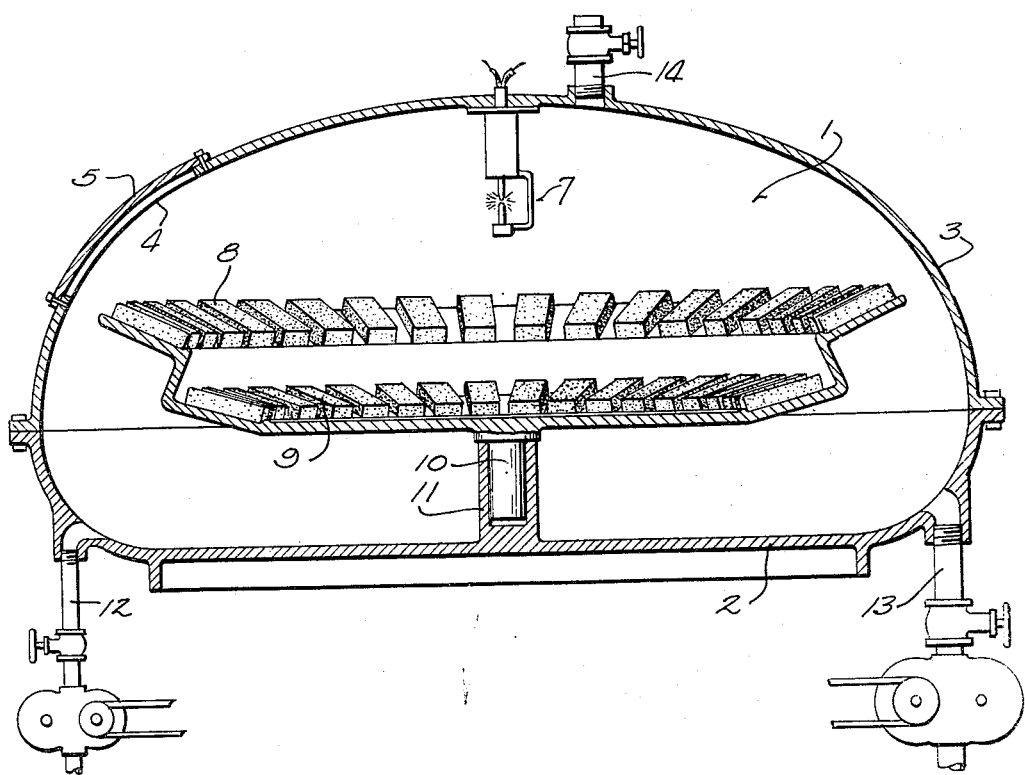
INVENTOR
FORTNEY H. STARK
BY Wheeler, Wheeler & Wheeler
ATTORNEYS Patented Aug. 5, 1952

2,606,122

UNITED STATES PATENT OFFICE 2,606,122

ACCELERATED AGING OF CHEESE

Fortney H. Stark, Wauwatosa, Wis.

Application June 9, 1947, Serial No. 753,470

32 Claims. (Cl. 99—217)

This invention relates to the accelerated aging of cheese, and particularly brick and Cheddar cheese. More generic aspects of the treatment herein involved, and the specific treatment of cheese other than brick and Cheddar, are no part of the present disclosure.

It is the primary object of the invention to reduce to a period of a few hours the active treatment comprising the principal parts of an aging program which normally requires several months. Including the active treatment, plus a desirable period of storage, a mild brick cheese suitable for marketing to the consumer can be produced by the present method within a week, or at most four to five weeks, after manufacture, as compared with the period of four to five months or more required to produce the same quality cheese by natural aging.

In this connection it is an important object of the invention to eliminate to a large measure the economic handicap of placing a valuable product in storage over so long a period as is currently required for aging. Not only is a huge inventory tied up for many months, but it is very common for cheese prices to fluctuate during the aging period, even to the extent of rendering the producer insolvent.

Another very important object of the present invention is to be able to control the aging to produce a uniform product. Where natural aging is practiced, the aging does not always progress satisfactorily. The flavor of the cheese may be impaired or destroyed during aging by factors which the cheesemaker does not understand and which he has not learned to control. Where the cheese is aged according to the method herein disclosed, its flavor and quality is uniformly high.

The drawing is purely diagrammatic and shows in transverse section an apparatus in which the novel steps of the process hereinafter described may be carried out.

In the drawing I have shown at 1 a pressure chamber comprising a base 2 and a removable cover 3 which may also have a manhole 4 provided with a separate removable cover 5.

Within the chamber is a carbon arc lamp 7 about which are disposed a shelf or shelves 8, 9, for the cheese to be treated. The carbon arc used is of a conventional type operated at 50 to 80 volts, or from 60 to 80 amperes, and used for ultra-violet irradiation of people or such commercial products as milk. However, the radiation from such an arc which is used for the purposes of the present invention is not the ultra-violet radiation (or at least not ultra-violet alone), but is believed to be a form of gamma radiation or the like. It has been found that the zone in which there is greatest effect from the type of radiation in which I am interested is the zone below the median plane which passes between the electrodes. It will be noted that both of the sets of shelves 8 and 9 are so situated. These shelves may, if desired, be mounted on a turntable 10 supported on a shaft 11 for rotation to bring any selected portion of any shelf within reach of the manhole 4.

The chamber 1 is provided with pressure, or pressure and vacuum connections at 12 and 13 which may be of any desired type and controlled in any desired manner. I have also provided a separate valve-controlled vent at 14.

In actual practice I have carried out in separate chambers the irradiation and pressure-varying steps hereinafter to be described. The drawing shows, merely for convenience of diagrammatic illustration, a single chamber for both operations, wherein they may be practiced alternately or concurrently.

Before describing what is accomplished, or referring to the technical theory involved, I shall first describe the actual operations as practiced, using brick cheese as an example.

The brick cheese is obtained from the producer within about three days after manufacture. It is in blocks measuring 3" x 5" x 10". The cheese is placed on the shelves for irradiation and its surfaces are moistened with water spray to prevent surface drying and to absorb at least some of the ultra-violet radiation and thereby to prevent deleterious flavor changes commonly resulting from long ultra-violet irradiation of milk products.

With the irradiation chamber ventilated to carry off fumes from the carbon arc, the arc is set in operation and the cheese is irradiated for three hours. At that time each brick of cheese is inverted and turned end for end and re-moistened, after which irradiation is continued for three more hours. The air used for ventilating the chamber is preferably humidified but despite this it is desirable to spray the cheese with water again at the time the irradiation is completed.

The cheese is now subjected repeatedly to variation of pressure. In practice I apply 75 pounds of air pressure for three six-hour periods alternating with periods of relief of pressure. During the interim of pressure relief, I repeat the irradiation procedure above described.

Upon the conclusion of three periods of irradiation and three alternating periods of high-pressure treatment, the cheese may be exposed to humid atmosphere on conventional curing room shelves which are naturally inoculated with organisms from the surface of aged cheese of high quality. Shelf curing is a preferred, but not at all a necessary, step. The purpose of the inoculations is to tend to prevent mold growth during shelf curing.

On the shelves the cheese bricks are turned every third day, and those that become dry or moldy are washed. This part of the procedure is conventional but it is preferably continued only for a few days, or at most about four weeks as compared with the many months of treatment normally required. In fact, cheese tested by experts within a few days after manufacture, and having meantime been subjected to the irradiation and pressure steps above described, has been adjudged a cheese of high merchantable quality.

The following variations in the procedure above outlined are appropriate:

1. The periods of irradiation and pressure treatment may be varied. Neither is critical.

2. The pressure used may be varied or may be alternated with vacuum. The pressure used is not critical, but the variation is at least a pound and preferably several pounds between minimum and maximum.

3. As indicated in the accompanying diagrammatic drawing, the irradiation and pressure treatments may be conducted in the same chamber. They may even be conducted simultaneously provided that provision is made, as by vent 14 and pressure supply connection 12 for continually ventilating the chamber 1, even during the periods of pressure. Several variations in pressure will normally be effected during, or alternating with, irradiation.

4. The oxygen content of the atmosphere to which the cheese is subject during treatment may be varied. The extent of permissible variation is not yet known but there is evidence that many of the organisms which produce desirable flavor changes, as well as those that are undesirable, depend upon some favorable oxygen-containing environment for their optimum growth. The establishment of a proper oxygen environment encourages some organisms, while it discourages others. While this subject has not been fully explored, it suffices to say that the best practice of the invention currently known involves the use of ordinary atmospheric air.

5. The period, temperature and type of storage (shelf or bulk) may be widely varied.

A technical discussion of the manner in which the procedure operates, or is believed to operate, is as follows:

The aging of cheese involves a cycle in which bacterial action assists the development of salt-soluble protein, while the development of protein in this form in turn promotes the desired bacterial action. The development of the desired bacteria and the desired salt-soluble protein is impaired when the cheese is made from pasteurized milk. The procedure herein disclosed, when applied to cheese made from pasteurized milk, not only restores the development of salt-soluble protein to a basis comparable to that which occurs in cheese which is made from unpasteurized milk but carries it far beyond.

The limiting factors which control the time required for the aging of cheese are first, the initiation of breakdown of protein to a salt-soluble form and, secondly, the escape of the gaseous by-products of the bacterial action or, possibly, the replacement of such gaseous by-products with oxygen.

Irradiation alone is capable of producing an aging of cheese within a few hours which is equivalent to that produced in several months of normal aging. Measureable results of irradiation include not only an increase in salt-soluble protein, but also fat breakdown and the production of desirable amino acids. The changes are those which occur in natural aging over long periods. Whether produced directly by the radiant energy or whether the radiation acts as a catalyst or otherwise activates enzymic action is not known. The results of record are useful not only to age and change the flavor of cheese, but also to produce protein and amino acids and other products having medicinal and other value. As applied to natural cheese to be used for manufacture of processed cheese, the electric arc radiation produces a texture uniformity that is very desirable for blending.

The theory underlying these results need not be discussed here, because the present application is not concerned with the generic aspects of such irradiation. Suffice it to say that the result is not attributable to ultra-violet radiation and cannot be achieved, so far as I am aware, by any harmless or inexpensive source of radiant energy other than an electric arc. It is believed to be energy of the nature of gamma radiation, the presence of which has not heretofore been recognized in the carbon arc. While such radiation is produced at low intensity and is therefore not harmful to persons working with the cheese, it suffices to effect definite aging of cheese and other products and other notable effects in a wide variety of other materials.

However, the aging which can be produced by carbon arc irradiation of cheese is produced within the first few hours, after which the development of aging process levels off and no further amount of immediate treatment at the same pressure seems to bring about any further aging or development.

The variation in pressure was undertaken in the belief that further aging was inhibited by the gaseous by-products of bacterial action remaining in the cheese and which, because of the rapidity of the aging process, were unable to escape in the normal manner. Apparently the gas arrests the development of the organisms which effect the aging of the cheese, either by creating an atmosphere unfavorable to the development of such organisms or by excluding from them oxygen which they need for growth. One factor indicating an accumulation of gaseous pressure within the cheese is the fact that during irradiation cheese which has been paraffin coated suffers a dislodging of the coating by gas bubbles developing within three hours behind the coating and forcing the coating away from the cheese.

Incidentally, the effect of irradiation of cheese with an electric arc may be varied by the type of coating used. "Pliofilm" (rubber hydrochloride film) and the like, when wrapped sufficiently tightly about the cheese to confine the $CO_2$ gas, causes the development of a relatively high acidity in the cheese, while paraffin, or the lack of any coating other than the cheese itself, by permitting the gases to escape, develops a relatively less acid or even a more alkaline product. It is believed that at least a part of the difference is attributable not merely to the escape of gases but to a secondary radiation, of which considerable evidence has been found, the secondary irradiation from "Pliofilm" being distinctively different from that which has been observed from paraffin when subjected to primary radiation from a carbon arc.

As an example of a cheese in which it is not only desirable but requisite that "Pliofilm" or the like be used as a wrapper, I may refer to bleu cheese. Without a tight "Pliofilm" wrapper to exclude the air and also to exclude a major portion of ultra-violet radiation, the bleu cheese oxidizes and rapidly becomes unedible. Being a mechanicaly ventilated product, bleu cheese does not require the pressure variation step, although this step may be used, preferably alternately with the irradiation step. In the case of bleu cheese wrapped in "Pliofilm," liquefaction of the protein component occurs with great rapidity, producing an amino acid solution which is of great value because it has the desirable flavor of the bleu cheese instead of the objectionable and offensive flavor and odor of amino proteins in liquid form which have previously been available.

Aside from the effect of the pressure variation by apparently allowing the cheese to "breathe," giving off accumulation of carbon dioxide gases and replacing these with atmospheric oxygen, the pressure variation may have any one or more of the following effects:

1. Diffusion of gases through or into or out of the cheese.
2. Movement of moisture through the cheese by the expansion and contraction of gas particles. It is believed that the gas is dissolved by the moisture and becomes evenly distributed throughout the cheese through the movement of the moisture film. Such movement might also involve movements of formed acids or dissolve substances throughout the cheese, thus accelerating chemical action.
3. Transportation through the cheese of limiting waste products of bacterial action.
4. Transportation of extracellular enzymes.
5. Physical change or breakdown of the curd due to mechanical movement resulting from change of pressure.
6. Accelerated chemical reaction of such flavor producing agents as result in the forming of esters.

In any event, it has been established that if the cheese is subjected to material pressure changes either before irradiation (to eliminate the effect of natural aging), or during irradiation, or after the irradiation has reached an arrested aging effect, continued or renewed aging, either natural or by radiation, will be accelerated and there is apparently no limit to which the aging may be carried by irradiation conducted under circumstances such that the gaseous by-products escape and are replaced by oxygen. Nine cycles of irradiation and pressure variation have been conducted without finding any limit to the continuous rapid development of both texture and flavor which accompanies aging.

Upon the completion of these cycles, particularly the first cycle, the desirable aged flavor is not immediately apparent. For example, the gas released from the pressure chamber following the first pressure treatment will be very sour with the odor and characteristic of green cheese. The full flavor developed by any given cycle of treatment becomes apparent only after the cheese has stood for perhaps four to six hours after restoration to atmospheric pressure.

One of the effects of irradiation is to limit the development of undesirable molds and yeasts. There are present in cheese at all times not only the desirable culture bacteria, but also yeasts and molds which have an acid-bitter taste. When cheese is condemned for acid flavor, the flavor is usually not in the cheese curd itself, but in the molds and yeast which have been permitted to grow there. Cheese regarded as unsatisfactory for commercial sale can be converted into perfectly acceptable high grade cheese by irradiation according to the present invention, which not only creates the correct soluble-protein conditions for the desirable culture bacteria but inhibits the growth of the undesirable yeast and molds. It is apparently a fact that whichever form of organism gets a start in the cheese is shortly able to dominate the others.

The production of satisfactory cheese has heretofore been dependent entirely upon the skill and ability of the cheesemaker to give the desirable bacteria a start before the undesirable bacteria and molds and yeast can take over. The trade literature recognizes that the pH of brick cheese measured three days after manufacture has to be at least 5 to 5.1 in order that such cheese may develop satisfactorily.

A cheese below the limits of pH 4.9 or above the upper limits of pH 5.3 will develop undesirable flavors, whereas a cheese within this range, preferably at 5.1, will be a high quality product. However, even with this knowledge no one has heretofore been able to control acidity or to correct the acid-bitter flavor after it develops. The only suggestion made in the trade literature was that the cheesemaker reduce the acidity of his next batch of cheese. By the present process, however, irradiation of cheese permits the acidity to be modified after the cheese is complete and destroys the acid-bitter flavor even after such flavor has developed. This is much easier than controlling acidity during manufacture, since a certain amount of acidity is necessary during manufacture to prevent rancidity and undesirable fermentation.

By confining the cheese in a wrapper such as "Pliofilm" during irradiation the acidity can be raised, while the irradiation of cheese fully exposed or coated with paraffin lowers acidity.

Nothing has thus far been said about the temperature at which the treatment is conducted. In actual commercial work, using the process herein disclosed, the cheese has always been processed at 70° throughout the period of treatment with no spoilage, whereas untreated cheese kept for less periods at 70° shows 25 to 30 percent spoilage. This temperature, however, was used only for convenience. I know of no critical temperature limitation.

From the foregoing it will be noted that the irradiation step, even without the step of pressure variation, is a useful means of accelerating the aging of cheese. It will further be noted that the step of pressure variation may separately comprise a useful step in the aging of cheese, whether or not irradiation is practiced. However, the two steps together cooperate to produce an aging which is much faster and more continuously operative than would be indicated by merely adding together the aging effects which they are capable of creating separately. As above noted, the irradiation alone speedily reaches a limit unless the pressure variation step is used to cause the cheese to "breathe." Similarly the pressure variation step alone cannot greatly accelerate aging unless aided by the step of irradiation.

I claim:

1. A method of treating cheese which comprises exposing the cheese to irradiation from a carbon arc and the further step of screening the cheese from ultra-violet irradiation from said arc.

2. The method set forth in claim 1 in which the screening step comprises enveloping said cheese in a wrapper resistant to ultra-violet radiation during irradiation.

3. A method of accelerating the aging of cheese which comprises the step of exposing the cheese to the irradiation from a carbon arc lamp while screening the cheese from ultra-violet radiation from such lamp, in combination with the step of subjecting the cheese to a sharp change in pressure.

4. The method set forth in claim 3 in which the variation in the pressure on the cheese is a separate step following the completion of a step of irradiation.

5. The method set forth in claim 3 in which the variation in pressure is conducted concurrently with the irradiation of the cheese.

6. The method set forth in claim 3 in which variation in pressure precedes irradiation.

7. The method of accelerating the aging of cheese which comprises the steps of subjecting the cheese to irradiation from a carbon arc lamp and sharply varying the pressure to which the cheese is subject, one of said steps being repeated alternately with the other.

8. The method of accelerating the aging of cheese which comprises the step of exposing the cheese to irradiation from a carbon arc lamp and the step of sharply varying the pressure to which the cheese is subject, the first step being repeated following the second.

9. The method recited in claim 8 in which the step of pressure variation comprises an increase of gaseous pressure on an exposed surface of the cheese in excess of one pound per square inch followed by a relief of such gaseous pressure.

10. A method of treating cheese with irradiation from a carbon arc, said method comprising a step in which the cheese is moistened and irradiated through superficial moisture.

11. The method of varying acidity of cheese after manufacture thereof which comprises exposing the cheese to irradiation of a carbon arc lamp while screening the cheese from ultra-violet radiation.

12. The method recited in claim 11 in which the cheese is positioned for such exposure in a position offset from a median plane between the arcs of such lamp.

13. The method recited in claim 11 in which the screen is capable of secondary radiation when irradiated by said lamp.

14. The method recited in claim 11 comprising the preliminary step of wrapping the cheese within a "Pliofilm" wrapper, the cheese being irradiated therein.

15. The method of claim 11 in which the screen comprises a layer of paraffin interposed between the arc lamp and the cheese.

16. A method of promoting the development of organisms desirable for the aging of cheese while inhibiting the development of molds and yeasts, which method consists in aging cheese during exposure to irradiation from a carbon arc lamp while screening the cheese from ultra-violet radiation from such lamp.

17. A method of promoting the development of organisms desirable for the aging of cheese while inhibiting the development of molds and yeasts, which method consists in aging the cheese during exposure to irradiation from a carbon arc lamp, and intermittently raising and lowering by at least one pound per square inch the gaseous pressure to which such cheese is subject.

18. A method of accelerating the aging of brick cheese which comprises subjecting the cheese to a carbon arc lamp irradiation while screening the cheese from ultra-violet radiation from such lamp.

19. The method set forth in claim 18 in further combination with the step of varying by at least one pound per square inch the pressure to which the cheese is subject.

20. The method of accelerating the aging of Cheddar cheese which comprises the step of exposing the cheese to a carbon arc lamp irradiation while screening the cheese from ultra-violet radiation from such lamp.

21. The method of claim 20 in combination with the further step of varying by at least one pound per square inch the pressure to which such cheese is subject.

22. A method of accelerating the aging of cheese which comprises exposing the cheese to irradiation from a carbon arc lamp, moistening surfaces of the cheese, subjecting the cheese with its moistened surfaces exposed to ambient atmosphere intermittently to variation of atmospheric pressure in an amount of at least one pound per square inch, and subsequently curing the cheese for a period.

23. The method of claim 22 in which the pressure variation involves raising the atmospheric pressure to which the cheese is subject by an amount equal to several pounds to the square inch and subsequently restoring the cheese to normal atmospheric pressure.

24. The method recited in claim 22 in which pressure variation and irradiation of the cheese are concurrently practiced.

25. The method recited in claim 22 in which pressure variation in the amount of several pounds to the square inch is practiced alternately with irradiation, both the irradiation and the pressure variation being repeated.

26. The method of accelerating the aging of cheese which comprises exposing the cheese to irradiation from a carbon arc lamp for a period of hours, moistening and shifting the position of the cheese during irradiation, subjecting the cheese repeatedly to pressure changes amounting to several pounds per square inch, continuing irradiation after such pressure variation, and subsequently curing the cheese.

27. The method recited in claim 26 in which the increased pressure to which the cheese is subjected is of the order of 75 pounds to the square inch.

28. The method of making a liquid protein material of medicinal value and agreeable flavor which comprises subjecting bleu cheese to electric carbon arc radiation while confining the cheese in a wrapper substantially impervious to air and highly resistant to penetration by ultra-violet radiation.

29. The method of varying the acidity of cheese which comprises screening the cheese from ultra-violet radiation and subjecting the screened cheese to irradiation from a carbon arc.

30. The method of producing fat breakdown which comprises subjecting cheese containing fat to the irradiation of an electric carbon arc while screening such cheese from ultra-violet radiation from such arc.

31. The method of developing amino acids which comprises subjecting a protein-containing cheese to the irradiation of an electric carbon arc while screening such cheese from ultra-violet radiation from such arc.

32. A method of treating cheese which comprises the step of subjecting the cheese to irradiation of a carbon arc and the step of increasing the oxygen content of the cheese by varying by at least one pound per square inch the pressure to which the cheese is subject, whereby to provide a favorable atmosphere for desirable bacteria to develop.

FORTNEY H. STARK.

REFERENCES CITED

The following references are of record in the file of this patent:

UNITED STATES PATENTS

| Number | Name | Date |
|---|---|---|
| 716,558 | Lacomme | Dec. 23, 1902 |
| 1,275,417 | Gillet | Aug. 13, 1918 |
| 1,754,950 | Henocque | Apr. 15, 1930 |
| 1,981,583 | Craig | Nov. 20, 1934 |
| 2,260,823 | Bettis | Oct. 28, 1941 |
| 2,364,049 | Bensel | Dec. 5, 1944 |
| 2,401,131 | Bensel | May 28, 1946 |
| 2,425,816 | Maxson | Aug. 19, 1947 |

FOREIGN PATENTS

| Number | Country | Date |
|---|---|---|
| 9,039 | Great Britain | May 2, 1901 |
| 417,863 | Great Britain | Oct. 11, 1934 |

OTHER REFERENCES

A. J. Dusault: "Ultraviolet in the Dairy Industry," Milk Dealer, 36, 6; 49, 100–102; March 1947; also found in Journal of Dairy Science, vol. 30, 1947, Abstracts of Literature, page A92; No. 206.

C. F. Doane et al.: "Varieties of Cheese," Bulletin 608, U. S. Dept. of Agr., March 6, 1918, published by Gov't Printing Office, Wash., D. C., pages 13, 18, 31, 57 and 58.